United States Patent
James

(10) Patent No.: US 6,352,368 B1
(45) Date of Patent: Mar. 5, 2002

(54) ROD END BEARING

(75) Inventor: Paul Anthony James, Letchworth (GB)

(73) Assignee: Springfix Linkages Limited, Hertfordshire (GB)

( * ) Notice: Subject to any disclaimer, the term of this patent is extended or adjusted under 35 U.S.C. 154(b) by 0 days.

(21) Appl. No.: 09/464,930

(22) Filed: Dec. 16, 1999

(30) Foreign Application Priority Data

Dec. 18, 1998 (GB) .............................................. 9827873

(51) Int. Cl.$^7$ ................................................ F16C 23/04
(52) U.S. Cl. ...................................... 384/203; 384/203
(58) Field of Search ......................... 384/192, 202–213

(56) References Cited

U.S. PATENT DOCUMENTS

| | | | |
|---|---|---|---|
| 3,094,376 A | 6/1963 | Thomas | 264/135 |
| 3,287,071 A | 11/1966 | Tucker | 384/208 |
| 3,574,429 A * | 4/1971 | Reising | 384/300 |
| 3,806,216 A | 4/1974 | Orkin et al. | 384/297 |
| 4,033,019 A | 7/1977 | Orkin | 29/898.047 |
| 4,053,665 A * | 10/1977 | Orkin et al. | 384/203 X |
| 4,080,015 A * | 3/1978 | Greby et al. | 384/206 |
| 4,084,863 A * | 4/1978 | Capelli | 384/300 |
| 4,615,638 A * | 10/1986 | Ito | 384/203 X |
| 5,073,038 A * | 12/1991 | O'Connell | 384/206 |
| 5,993,065 A * | 11/1999 | Ladzinski et al. | 384/49 |

* cited by examiner

Primary Examiner—Thomas R. Hannon
(74) Attorney, Agent, or Firm—Stroock & Stroock & Lavan LLP

(57) ABSTRACT

A rod end bearing comprises an outer shell part having a generally spherical inner surface and having a pair of diametrically opposed openings and an inner ball part seated within the outer shell part. The outer diameter of the ball part is greater than the diameter of one of said diametrically opposed openings and is only slightly less than the diameter of the other of the diametrically opposed openings. A moulded bearing race is located between the inner ball part and the outer shell part. The bearing race is suitably formed from polyurethane.

14 Claims, 2 Drawing Sheets

ROD END BEARING

This invention relates to rod end bearings. Such bearings are of the type required to connect together two rods, components or assemblies with a spherical or ball type joint.

Usually such moulded race bearings comprise three parts, namely an outer shell part, an inner ball part and a moulded race situated between the outer shell part and the inner ball part. Suitably the outer shell part and the inner ball part are formed from leaded steel while the moulded race is a suitable injection moulded reinforced nylon.

Various problems exist with the manufacture and use of the known bearings. These problems include the possibility of the rod ends pulling apart where significant axial overloading takes place and also ensuring sufficient accuracy to prevent the existence of play and to provide a smooth free running bearing that does not introduce excessive friction into the linkage assembly.

The present invention seeks to provide a new and improved rod end bearing having a good accuracy and which is resistant to axial overloading.

According to a first aspect of the invention, there is provided a rod end bearing comprising an outer shell part defining a generally spherical inner surface and defining a pair of diametrically opposed openings, an inner ball part seated within said outer shell part, the outer diameter of said ball part being greater than the diameter of one of said diametrically opposed openings and being only slightly less than the diameter of the other of said diametrically opposed openings and a moulded bearing race located between said inner ball part and said outer shell part.

The moulded bearing race may comprise injection moulded polyurethane.

According to a second aspect of the invention, there is provided a rod end bearing comprising an outer shell part having a generally spherical inner surface, an inner ball part seated within the outer shell part and a moulded bearing race located between the outer shell part and the inner ball part and formed from injection moulded polyurethane.

The outer shell part may have a pair of diametrically opposed openings and the outer diameter of the inner ball part is only slightly less than the diameter of at least one of the diametrically opposed openings.

The diameter of the other opening in the outer shell part is preferably less than the outer diameter of the inner ball part.

The inner ball part may comprise a generally spherical body having flattened side parts which are diametrically opposite to each other, the body being penetrated by a bore which extends through the centre of the sphere of the spherical body from one of the flat parts to the other flat part.

The outer shell part may be provided with a radially extending projection for the attachment of a rod end thereto and the projection may comprise a socket into which the rod end can be inserted.

The outer shell part may have a through bore extending from the outside of the outer shell part to the inside of the outer shell part for injection of moulding material into the inside of the outer shell part.

The bearing race may be formed by injection of material into the cavity left between the outer shell part and the inner ball part and a recess may be provided on the outer surface of the outer shell part in communication with the cavity to receive material overflowing from the cavity to provide a region in which identification markings may be moulded.

The invention will now be described in greater detail, by way of example, with reference to the drawings, in which.

Figure 1:
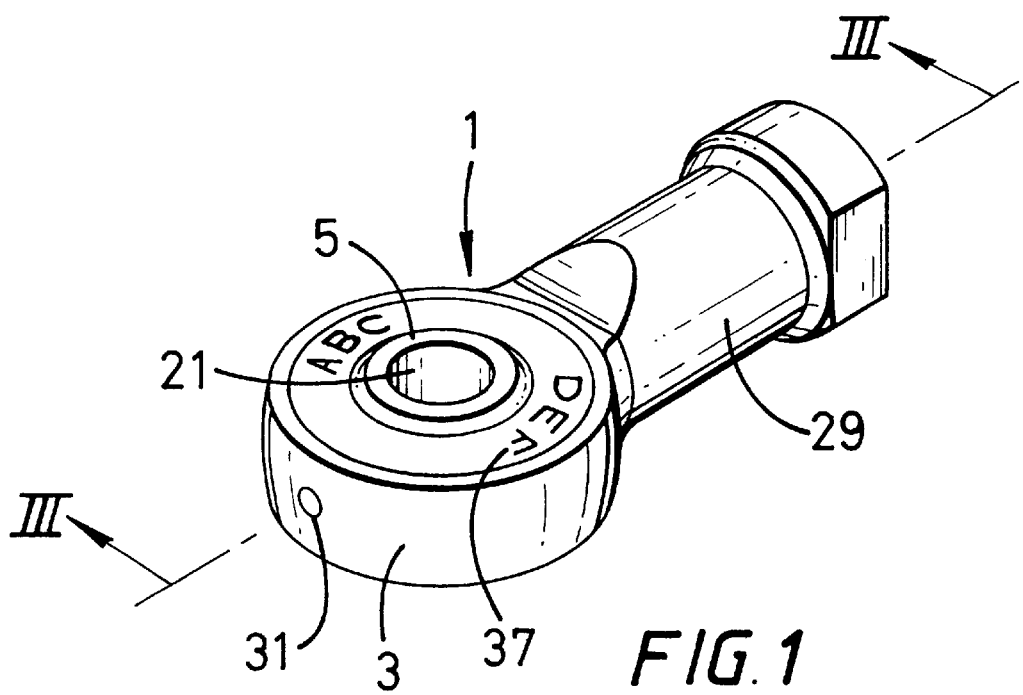
FIG. 1 is a perspective view of one form of rod end bearing in accordance with the invention.
Figure 2:
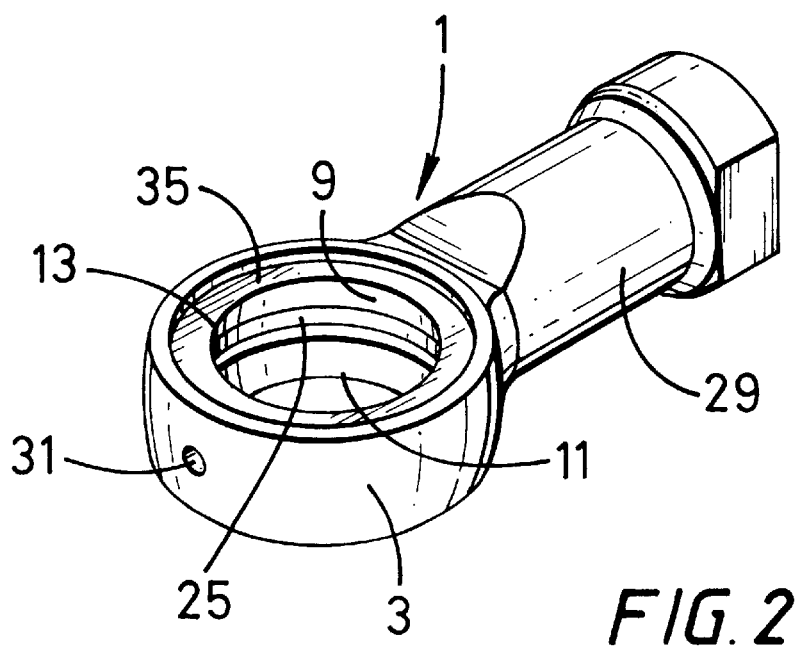
FIG. 2 is a view similar to figure one of the outer shell part with the inner ball part and the injection moulded bearing race removed.

Referring to the drawings, one form of rod end bearing 1 comprises an outer shell part 3, an inner ball part 5 and an injection moulded bearing race 7.

The outer shell part 3 and the inner ball part 5 may suitably be made of leaded steel while the injection moulded bearing race is moulded from polyurethane. Polyurethane has been found to be particularly suitable for forming relatively thin bearing races instead of the more usual nylon. With this material further lubrication is not normally necessary but the polyurethane may, if desired, have an additive to ensure permanent lubrication.

Figure 3:
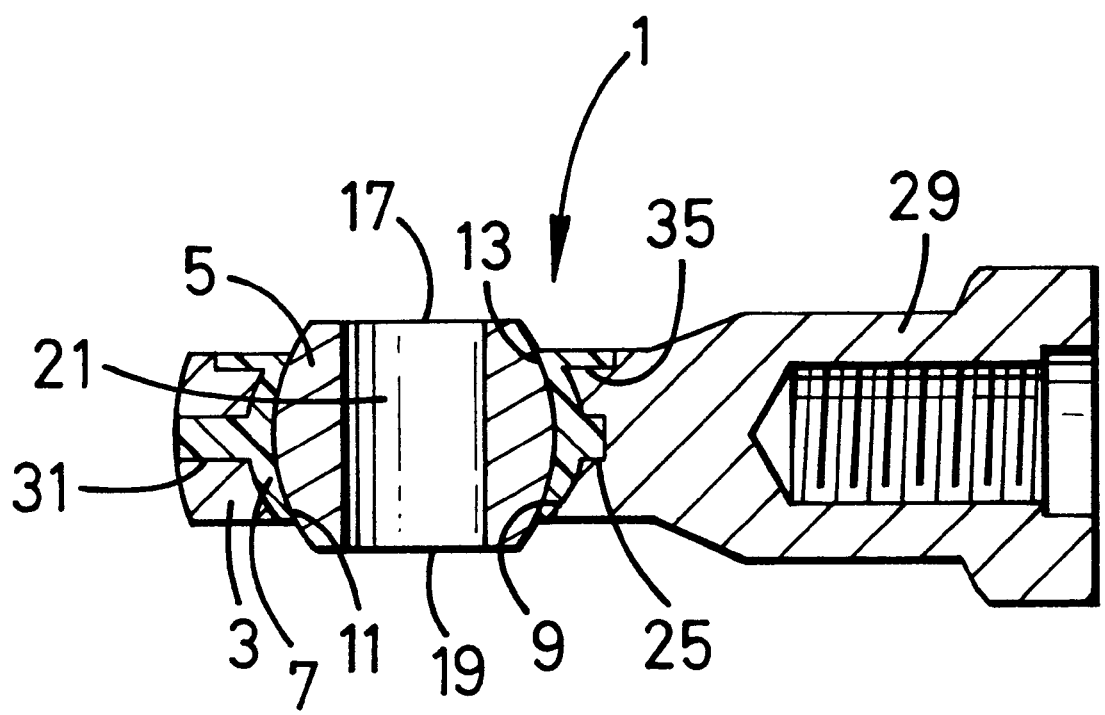
FIG. 3 is a sectional view of the bearing of FIG. 1 taken on the line III—III of FIG. 1.

As can be seen from the sectional view of FIG. 3, the outer shell part 3 has an interior generally spherical surface 9 which receives the injection moulded bearing race 7. The spherical surface 9 has two diametrically opposed openings 11 and 13 of which the opening 13 has a diameter slightly greater than the outer diameter of the inner ball part 5 to allow the inner ball part 5 to be inserted into the outer shell part 3 during manufacture while the opening 11 has a diameter between the outer diameter of the ball part 5 and the diameter of the rod being connected so that the ball part 5 cannot pass herethrough. For example, the difference between the diameter of the opening 13 and the outer diameter of the inner ball part 5 can lie in a range of between 0.7 mm to 1.5 mm but this can vary depending upon the overall size of the bearing.

The inner ball part 5 of the bearing comprises a generally spherical body 15 having flattened side parts 17 and 19 which are diametrically opposite to each other. The body 15 is penetrated by a bore 21 which extends through the centre of the sphere of the spherical body from one of the flat parts 17 to the other flat part 19. This bore 21 is adapted to receive the end of the rod or other part (not shown) with which the bearing is intended to use.

It will be seen that the inner surface 9 of the outer shell part 3 is provided with an annular groove 25 into which the material of the bearing race 7 is forced so as to prevent rotation of the bearing race 7 to protrude out of the outer shell part 3 and to maintain its position therein while allowing appropriate movement of the inner ball part 5. The outer shell part 3 has a socket 29 extending radially from the outer surface thereof to receive the end of the other rod to be coupled to the bearing 1. It is also provide with a bore 31, suitably opposite to the socket 29, for injection moulding of the bearing race 7 and with an annular recess 35 which will enable the moulding material to become visible so that identification and other details 37 can be placed thereon.

Manufacture of the bearing will now be considered:

The inner ball part 5 is inserted into the outer shell part 3 through the opening 13 in the outer shell part 3 and the thus assembled parts are inserted into a closed injection mould with the inner ball part 5 being held in the centre of the outer shell part 3 leaving a space therebetween. It will be observed that this space is vary narrow so that the bearing race 7 formed in the bearing will only be a relatively thin film over most of its area.

The material of the bearing race is then injected into the outer shell part 3 through the bore 31 so as to fill the cavity between the inner ball part 5 and the outer shell part 3, the material overflowing into the annular recess 35. If the mould is provided with suitable inserts, any identification or the like can be moulded into the material in this recess 35.

The bearing can then be removed from the mould.

It will be appreciated that various modifications of the above described embodiment are permissible within the scope of the appended claims.

For example, the socket provided on the outer shell part could be replaced with a threaded spigot adapted to mate with a threaded bore in the rod to which it is to be connected or, if the rod is fitted with a bearing receiving socket, the socket on the outer shell part may be omitted. Similarly, the inner ball part could be provided with a spigot instead of the through bore. Also, to decrease the possibility of the inner ball part being moved out of the outer shell part 3 under excessive axial overloading, the edge of the opening 13 may have an upstanding lip which can be peened or pressed over before the injection of the moulded bearing race 7 so as to reduce the diameter of the opening 13 to less than that of the inner ball part 5.

What is claimed is:

1. A rod end bearing comprising an outer shell part defining a generally spherical inner surface and defining a pair of diametrically opposed openings, an inner ball part seated within said outer shell part, the outer diameter of said ball part being greater than the diameter of one of said diametrically opposed openings and being only slightly less than the diameter of the other of said diametrically opposed openings and a moulded bearing race located between said inner ball part and said outer shell part.

2. A bearing as claimed in claim 1, wherein said moulded bearing race comprises injection moulded polyurethane.

3. A bearing as claimed in claim 2, wherein said outer shell part has a through bore extending from the outside of said outer shell part to the inside of said outer shell part for injection of moulding material into the inside of said outer shell part.

4. A bearing as claimed in claim 2, wherein said bearing race is formed by injection of material into the cavity left between said outer shell part and said inner ball part.

5. A bearing as claimed in claim 4, wherein a recess is provided on the outer surface of said outer shell part in communication with said cavity to receive material overflowing from said cavity to provide a region in which identification markings may be moulded.

6. A bearing as claimed in claim 1, wherein said outer shell part has an annular groove running around said spherical inner surface about an axis passing through the centres of said diametrically opposed openings for receiving an annular ring formed on said moulded bearing race.

7. A bearing as claimed in claim 1, wherein said inner ball part comprises a generally spherical body having flattened side parts which are diametrically opposite to each other, said body being penetrated by a bore which extends through the centre of the sphere of the spherical body from one of said flat parts to the other flat part.

8. A bearing as claimed in claim 1, wherein said outer shell part is provided with a radially extending projection for the attachment of a rod end thereto.

9. A bearing as claimed in claim 8, wherein said projection comprises a socket into which said rod end can be inserted.

10. A rod end bearing comprising an outer shell part having a generally spherical inner surface, an inner ball part seated within said outer shell part and a moulded bearing race located between said outer shell part and said inner ball part and formed from injection moulded polyurethane, wherein said outer shell part has a pair of diametrically opposed openings and the outer diameter of said inner ball part is only slightly less than the diameter of at least one of said diametrically opposed openings.

11. A bearing as claimed in claim 10, wherein the diameter of said other opening in said outer shell part is less than the outer diameter of said inner ball part.

12. A bearing as claimed in claim 11, wherein said outer shell part has an annular groove running around said spherical inner surface about and axis passing through the centers of said diametrically opposed openings for receiving an annular ring formed on said moulded bearing race.

13. A rod end bearing comprising an outer shell part having a generally spherical inner surface, an inner ball part seated within said outer shell part and a moulded bearing race located between said outer shell part and said inner ball part and formed from injection moulded polyurethane, wherein said bearing race is formed by injection of material into the cavity left between said outer shell part and said inner ball part and a recess is provided on the outer surface of said outer shell part in communication with said cavity to receive material overflowing from said cavity to provide a region in which identification markings may be moulded.

14. A rod end bearing comprising an outer shell part defining a generally spherical inner surface and defining a pair of diametrically opposed openings, an inner ball part seated within said outer shell part, the outer diameter of said ball part being greater than the diameter of one of said diametrically opposed openings and being only slightly less than the diameter of the other of said diametrically opposed openings and a bearing race of injection moulded polyurethane located between said inner ball part and said outer shell part, said outer shell part havimg an annular groove running around said spherical inner surface about an axis passing through the centres of said diametrically opposed openings for receiving an annular ring formed on said moulded bearing race, said inner ball part comprising a generally spherical body having flattened side parts which are diametrically opposite to each other, said body defining a bore which extends through the centre of the sphere of the spherical body from one of said flat parts to the other of said flat parts, said outer shell part being provided with a radially extending projection for the attachment of a rod end thereto.

* * * * *